May 1, 1951     V. W. SORENSEN     2,551,400
COWL FASTENER
Filed July 2, 1946
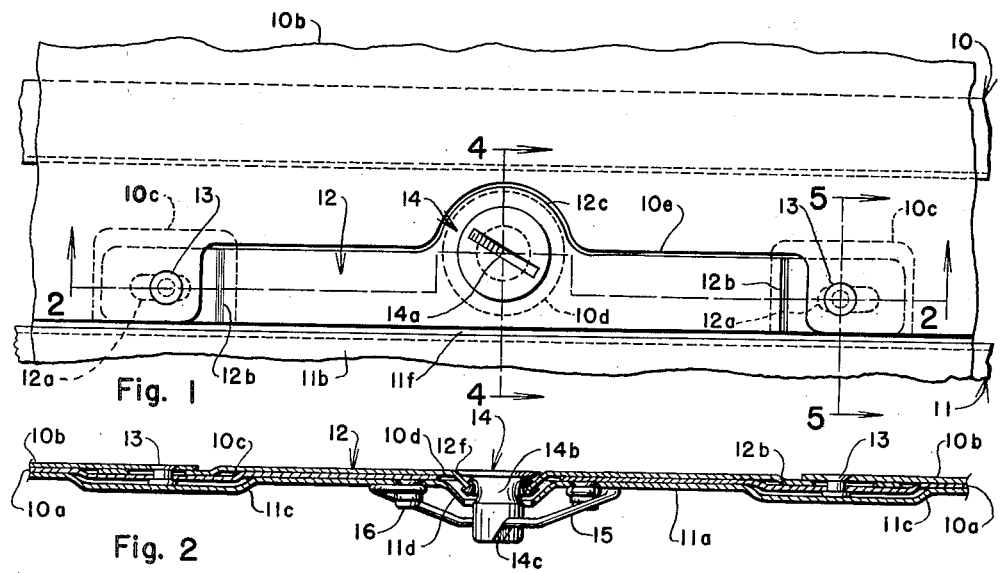
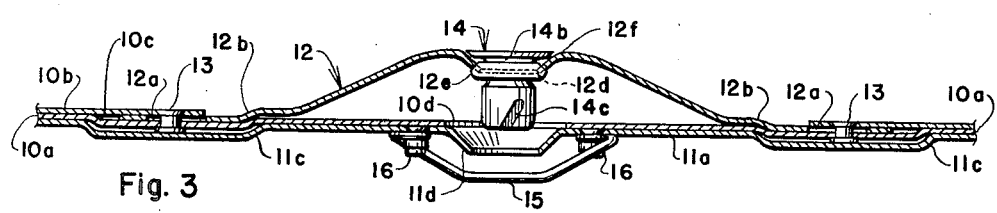
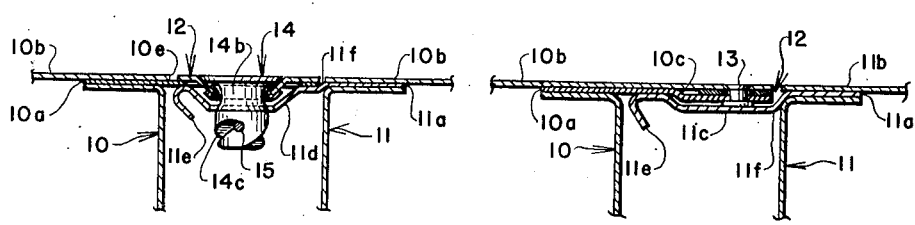
INVENTOR.
Victor W. Sorensen
BY
HIS PATENT ATTORNEY Patented May 1, 1951

2,551,400

UNITED STATES PATENT OFFICE 2,551,400

COWL FASTENER

Victor W. Sorensen, Los Angeles, Calif., assignor to North American Aviation, Inc.

Application July 2, 1946, Serial No. 680,940

5 Claims. (Cl. 24—221)

This invention relates to fastening devices and more particularly to an improved fastener of the quick-detachable type adapted for use on the cowlings of aircraft, access covers and similar devices.

The present invention relates to the provision of a leaf spring for a fastening device slidably attached at its terminals to one of a pair of separable mating members. The leaf spring resiliently carries a fastening bolt or stud at its mid-portion in such manner that it is retracted from the surface of the member when it is unlocked whereby complete disengagement of the fastener may be effected as well as the separation of the mating members. Previous efforts directed to the solution of this problem in connection with the stud retraction of quickly detachable fasteners have encountered difficulties in that the stud retracting means tend to catch on the mechanic's clothing and other objects and accordingly to become bent or otherwise damaged. In this condition the bent members do not permit proper functioning of the closure in subsequent operations. The present fastening device provides an installation which does not tend to engage adjacent objects or to create an objectionable hazard in this respect. It also prevents the inadvertent loss of the studs, retaining them in position for immediate re-engagement. The present fastening device has been found desirable and satisfactory on aircraft cowl sections and similar installations particularly where the mating members have curved surfaces and where their removal would be interfered with unless the fastener studs were completely disengaged after being unlocked.

A primary object of this invention is the provision of an improved fastening device which is quickly attachable and readily releasable to facilitate the rapid attachment and separation of a pair of separable cover members. It is a further object to provide a fastening device of the countersunk or flat head type which closely and securely maintains the separable members together in their closed positions, in a smooth and flush relationship, to thereby provide a continuous exterior surface of good aerodynamic qualities. A further and important object of the present invention is to provide a cowl fastener of the described type which is self-contained and resiliently retained in its detached position by a spring plate element to one of the mating cover members which it serves to fasten.

It is a further object to provide such a cowl fastener assembly in which a slotted stud element is resiliently retracted and held in a detached position from which it is readily pressed into engagement and locked without the necessity of first aligning the several elements in order to complete the attachment of the assembly. It is a still further object to provide a cowl fastener arrangement for retracting the fastener studs in which the removal of curved or contoured members, such as the cowlings or fairings of aircraft, is materially facilitated.

A further object lies in the production of a cowl fastener of a simple and low cost construction, which is comprised of a relatively few parts, and which may be readily assembled and installed. A further object of the invention resides in the provision, in a flush type readily releasable cowl fastener, of a leaf-like spring arrangement by which a conventional fastener stud is retained, or prevented from being separated from the outer cover element and lost or misplaced in its retracted or detached position. It is also an object to have the resilient leaf spring retainer assist in making the fastening secure when assembled by exerting a resilient pressure which is maintained in the engaging position of the fastener in a secure and fixed relationship from which it cannot be released or unlocked inadvertently due to vibrations and other causes.

Other objects and advantages of the present invention will become apparent to those skilled in the art after a reading of the present specification and the attached drawings forming a part hereof, in which:

Fig. 1 is a partial plan view of a pair of overlying cover plate members attached by a preferred form of the present fastening device;

Fig. 2 is a cross-sectional view of the cover plate members and the fastening device as taken along the line 2—2 of Fig. 1;

Fig. 3 is a similar cross-sectional view of the same cover plate members but with the fastening device in its detached position;

Fig. 4 is a cross-sectional view of the cover members and fastening device in its detached relationship as taken along the line 4—4 of Fig. 1; and Fig. 5 is a similar cross-sectional view taken along the line 5—5 of Fig. 1.

The numerals 10 and 11 refer generally to the overlying cover plate members or assemblies which have been selected for attachment by the preferred form of the resilient fastening device about to be described. The cover assembly 10, which may preferably be the outer movable member of the assembly, may comprise in addition to its framework 10, an edge strip or fastening sheet 10a and a cover plate or sheet 10b. The sheets 10a and 10b are preferably attached to the framework 10 by welding, riveting or other suitable means which have not been shown in the drawings.

The other portion or member of the pair of cover assemblies, represented by the numeral 11 designating its framework, its edge attachment strip 11a and its cover plate or sheet 11b, may preferably be the fixed or underlying member of the pair. It will be understood, however, that the improved fastening device of this invention is equally applicable to installations where either, or both, of the assemblies are relatively movable with respect to each other. Similarly the frame members 11, the edge strip 11a and the cover sheet 11b are welded, riveted or otherwise attached securely to each other to form a rigid assembly. The edge strip 11a is inwardly joggled or offset at 11f in order to underlie the corresponding edge strip 10a of the opposite assembly and to permit a closely abutting relationship of the respective cover sheets 11b and 10b such that their outer surfaces are continuous and flush. While these cover sheets 10b and 11b are shown in the drawings as plane or flat they are frequently curved or contoured when forming parts of aircraft cowling and other component and the fastening device of this invention is peculiarly adapted to those installations in which the cover sheets are curved and contoured.

The edge strip 10a is joggled or offset downwardly or inwardly at spaced positions indicated at 10c. These depressed portions 10c are provided to receive the similarly joggled ends of the spring strip or leaf 12. The latter is provided at each end with an elongated slot 12a engaging the rivets 13 passing through matching apertures in the edge strip 10a and the cover plate 10b. These rivets or detents pass through the slots 12a but are not drawn tight and have sufficient clearance that the ends of the leaf spring 12 may slide laterally, as viewed in Figs. 1 and 2, or longitudinally of the joint. The rivets 13 are preferably of the countersunk or flat head type to present a flush exterior surface and the edge strip 11a of the opposite joint half is joggled or offset downwardly or inwardly at 11c to accommodate the heads of the rivets 13 as well as the similarly offset portions of the opposite edge strip 10a as joggled at 10c. The leaf spring 12 is similarly joggled or offset at 12b in order to allow the aforesaid lateral movement of the leaf spring, as well as to permit its adapting a flush position with respect to the outer surface of the cover sheets 10b and 11b, as may be seen in the sections in Figs. 2, 4 and 5.

The respective cover sheets 10b and 11b are preferably smooth and continuous across the line of the joint, irrespective of whether the body in which the joint is formed is flat or contoured, and these cover sheets are not joggled or offset as in the case of the edge attachment strips 10a and 11a, and the flat pattern leaf spring 12. The cover sheet 10b, however, has a cutout portion 10e running parallel to the joint and of a width to accommodate that of the leaf spring 12, with a semi-circular portion centrally disposed between the rivets 13, to accommodate the stud 14 of the fastener per se. The leaf spring 12 has a similar semi-circular lug or ear portion 12c, fitting within the portion 10e, to accommodate the stud 14, and has a dimpled central opening 12d which is spaced off the center line extending between the rivets 13, or farther from the edge of the joint. The stud 14 has a reduced diameter neck portion 14b about which the grommet 12e is crimped or attached to the edges of the opening 12d, whereby the stud 14 is rotatably carried by the leaf spring 12 while restrained in axial movement with respect thereto. The leaf spring is crowned slightly at 14f in its mid-portion at either side of the stud 14 and accordingly, upon disengagement or detachment of the fastener stud the latter is fully retracted or withdrawn into the position shown in Fig. 3.

The central portion of the edge strip 10a is apertured at 10d to accommodate the dimpled portion of the leaf spring 12 and the attached stud 14, and the corresponding portion of the opposite edge strip 11a is apertured and inwardly dimpled at 11d to accommodate the central portion of the leaf spring 12, the attached grommet 12e and the stud 14 carried thereby. A cross wire spring 15 has upwardly offset coiled ends which are attached by the countersunk head rivets 16 to the edge strip 11a in such manner that the straight central portion of the cross wire 15 extends diametrically across the openings 10d and 11d in the path of the stud 14 and its downwardly facing slot 14c which is adapted to engage the wire 15 in a manner well known in the art. A kerf or slot 14a is provided in the head of the stud 14 by which a screw-driver, or other suitable tool, may be inserted for rotation of the stud into its attached or detached position. The outer edge of the attachment strip 11a is preferably reinforced by the inwardly turned flange 11e as indicated in the sections of Figs. 4 and 5.

In the closed position of the fastening device as shown in Fig. 2, the stud 14 has been rotated in a clockwise direction, looking downwardly, drawing the stud downwardly and the central portion of the spring 15 upwardly. This has the effect of securing together the overlapping edge strips 10a and 11a. In addition to the spring tension heretofore obtained in prior devices by virtue of the cross wire spring 15, it will be noted that the dimpled central portion of the leaf spring 12 adjacent the shoulder portions 12f is also sprung or deflected downwardly to assist in the tension developed by the stud within the wire 15 and to draw the flat spring 12 into its truly flattened position in which it lies flush between the opposed cover plates 10b and 11b. When the stud 14 is released by rotation in the opposite or counterclockwise direction, the stored energy in the leaf spring 12 exerts itself and it assumes the position shown in Fig. 3 in which its ends are drawn toward its central portion which extends upwardly from the surface of the sheets 10a and 10b carrying the stud into a fully retracted and remote position. In this ejected or retracted position of the stud as shown in Fig. 3, the respective assemblies 10 and 11 are readily separated in order to open the cowling, access cover or other components with equal facility whether the movable member 10 is moved outwardly bodily, hinged to swing through an arc, or is mounted to slide away from its relatively fixed counterpart 11.

In the retracted position of the stud 14 it cannot become lost or misplaced, is not subject to damage and is resiliently held in readiness in a position from which it is readily moved into position by a mechanic simply by the insertion of a tool into its kerf 14a, pushed downwardly and rotating such that the slot 14c makes engagement with the cross wire spring 15. It will also be noted that in the retracted position of the grommet and the leaf spring the former is resiliently carried by the spring in a floating condition in which it is slidably guided between the end rivet detents 13; and also that sufficient flexibility exists within the leaf spring that, where the joint follows the curvature of a contoured body and the axes of the rivets 13 are not parallel, the grommet 14 is readily positioned with the assistance of the dimpled plate portion 11c into engagement with the cross wire spring 15.

It will also be noted that the spring strip 12 can also be twisted to follow the curvature of the cover sheets as they abut along the joint which is locked by the present fastening device in installations where the cover sheets are contoured.

It will accordingly be seen that the disclosed construction provides a resilient retention means for the stud which derives all of the foregoing advantages and objects. In addition, it will be noted that any accidental re-engagement of the stud with the locking spring 15 is prevented and at no time can be lost by a mechanic going back over a series of such studs along a joint to determine which stud may still be engaged. Inasmuch as the leaf spring and studs are immediately retracted upon disengagement, those which have been detached are clearly visible to the mechanic and there is no tendency to deflect or force the upper sheets separate from the lower sheets which would have the effect of binding the same due to distortion and bending. Other modifications and advantages of the present invention both with respect to its general arrangement and the detailed features of its respective elements, which may become apparent to those skilled in the art after a reading of the foregoing specification, are each intended to be embraced within the scope and spirit of this invention as more particularly defined in the appended claims.

I claim:

1. The combination with a detachable fastener having a stud element, of a sheet member having an opening for said stud element, detents carried by said sheet member on opposite sides of said opening, leaf spring means having offset end portions slidably guided by the detents on said sheet member disposed beneath said sheet member, said leaf spring means adjustably carrying said stud at an intermediate portion within said sheet member opening, said leaf spring means and its slidably guided end portions adapted to retract said stud from the surface of said sheet member in the detached position of said stud and to guide said stud for insertion into its attached position in which said stud and said leaf spring means occupies the opening in said sheet member in a flush relationship therewith.

2. In a rotatable stud cowl fastener adapted for the releasable attachment of a pair of overlying cover sheets, resilient means for the support of a rotatable stud from one of said cover sheets including spaced detents carried by the upper one of said cover sheets, said detent-carrying cover sheet having an opening between said detents, a flat spring means having slotted end portions in engagement with said detents and rotatably carrying said stud at an intermediate portion within said opening, and offset portions in said spring means adjacent said end portion, said offset end portions disposed beneath the upper of said cover sheets, said stud normally deflected by said resilient means from the plane of said cover sheets in its detached position and said offset portions causing said stud and spring means to be disposed flush with respect to said detent-carrying cover sheet.

3. The combination with a detachable fastener having a rotatable stud, of a detent-carrying cover sheet having an opening therein, elongated leaf spring means adjustably attached at its end portions to the detents on said cover sheet and arranged to occupy the opening therein, said spring means rotatably carrying said stud at an intermediate portion, offsets in said spring means adjacent its end portions, said offset end portions underlying said cover sheet in the region of said detents, the said spring means and its adjustably attached end portions cooperating to retract said stud from the plane of said cover sheet in its detached position and to assist in guiding said stud into it fastened position wherein it is caused by said offsets to lie flush with said detent-carrying cover sheet.

4. The combination with a detachable fastener having a rotatable stud, of a detent-carrying cover sheet, leaf spring means adjustably attached at its end portions to the detents on said cover sheet, said spring means rotatably carrying said stud intermediate said end portions, offsets in said spring means adjacent said end portions adapted for the adjustable attachment of its end portions to the detents on the under-side of said cover sheet and the assumption of a flush relationship of its intermediate portion with said cover sheet, the said spring means and its adjustably attached end portions adapted to retract said stud from the plane of said cover sheet in its detached position.

5. The combination with a detachable fastener having a rotatable stud, of a cover sheet having a marginal aperture, said cover sheet carrying spaced detent means adjacent said aperture, leaf spring means adjustably attached at its end portions to the detent means on said cover sheet, said spring means rotatively carrying said stud intermediate said end portions, offset portions in said spring means adjacent said end portions adapted for the adjustable attachment of its end portions to the said detent means on the under side of said cover sheet in a flush relationship of its intermediate portion with said cover sheet in the attached position of said fastener.

VICTOR W. SORENSEN.

REFERENCES CITED

The following references are of record in the file of this patent:

UNITED STATES PATENTS

| Number | Name | Date |
| --- | --- | --- |
| 1,798,526 | Fitzgerald | Mar. 31, 1931 |
| 1,955,740 | Dzus | Apr. 24, 1934 |
| 2,270,403 | Bignell | Jan. 20, 1942 |
| 2,309,733 | Jones | Feb. 2, 1943 |
| 2,392,718 | Baldwin | Jan. 8, 1946 |